United States Patent [19]
Willits

[11] Patent Number: 4,890,970
[45] Date of Patent: Jan. 2, 1990

[54] PORTABLE PALLET CARRIER

[76] Inventor: Michael B. Willits, 18132 Highway 392, Greeley, Colo. 80631

[21] Appl. No.: 284,179

[22] Filed: Dec. 14, 1988

[51] Int. Cl.⁴ .......................... B60R 9/00; B62D 25/20
[52] U.S. Cl. ................... 414/462; 224/42.41; 296/37.1; 414/500
[58] Field of Search ............... 414/462, 463, 466, 498, 414/500, 540, 541, 461; 224/42.23, 42.41, 42.21, 42.46 R; 296/37.2, 37.1; 410/34, 35, 52, 100, 96

[56] References Cited

U.S. PATENT DOCUMENTS

| | | | |
|---|---|---|---|
| 3,149,739 | 9/1964 | Brown Jr. | 414/500 |
| 3,622,025 | 11/1971 | Petersen | 414/461 |
| 4,418,853 | 12/1983 | Shaffer | 224/42.23 X |
| 4,449,881 | 5/1984 | Lane | 414/463 X |
| 4,564,134 | 1/1986 | Seibert | 296/37.1 X |
| 4,597,711 | 7/1986 | Liebermann | 414/466 X |

FOREIGN PATENT DOCUMENTS 1281518  7/1972  United Kingdom ............... 410/100

Primary Examiner—Frank E. Werner
Assistant Examiner—James T. Eller
Attorney, Agent, or Firm—Zarley, McKee, Thomte, Voorhees & Sease

[57] ABSTRACT

A portable pallet rack is described and includes a horizontally disposed frame having supporting wheels provided thereon. The rack is designed to accommodate either four or six stacks of pallets thereon. The pallet rack is moved beneath the underside of the trailer floor and is vertically movably mounted with respect to the trailer by means of a pair of winch assemblies. The winch assemblies are quickly and easily adjustably mounted at the underside of the floor without any welding or drilling being required. The fact that the winch assemblies are quickly and easily adjustably mounted at the underside of the floor permits the pallet rack to be longitudinally shifted to place the weight thereof either on the rear axle of the trailer or on the truck.

7 Claims, 5 Drawing Sheets

PORTABLE PALLET CARRIER

BACKGROUND OF THE INVENTION

This invention relates to a pallet carrier and more particularly to a portable pallet carrier which may be positioned beneath the underside of a trailer or the like to support a plurality of pallets thereon in a stacked condition.

Pallets are used in the transportation of freight from one location to another and usually consist of spaced apart upper and lower surfaces defining a space therebetween adapted to receive the tines of a fork lift truck or the like so that the pallets may be moved. It is sometimes necessary to transport the empty pallets from one location to another and the truck operator frequently does not have any available cargo space for the transportation of the empty pallets. Frequently, the trucker is forced to abandon the pallets which obviously is costly.

Certain types of pallet racks have been devised in an attempt to relieve the problem but have not been entirely satisfactory. The pallet racks of the prior art are not easily moved and normally require that some sort of supporting structure be welded or bolted to the underside of the trailer therefore requiring considerable modification of the trailer. Additionally, the prior art pallet racks are not easily longitudinally movably mounted with respect to the trailer. Further, the conventional pallet racks are not conveniently vertically movable with respect to the trailer.

Therefore, it is a principal object of the invention to provide an improved pallet rack.

A further object of the invention is to provide a portable pallet carrier or rack.

Still another object of the invention is to provide a pallet rack which may be adjustably mounted on the underside of a trailer without the necessity of welding, drilling, etc.

Still another object of the invention is to provide a pallet rack which may be quickly and easily removed from the underside of the trailer to permit the trailer to cross over a curb, embankment, ditch or other irregularity that would otherwise restrict movability.

Yet another object of the invention is to provide a portable pallet rack which is vertically movably mounted beneath the floor of a trailer by means of a winch assembly, thereby permitting the operator to adjust the height of the rack depending upon the number of pallets stacked upon it.

Still another object of the invention is to provide a portable pallet rack which is economical of manufacture, durable in use and refined in appearance.

These and other objects of the invention will be apparent to those skilled in the art.

SUMMARY OF THE INVENTION

A portable pallet rack is described and includes a horizontally disposed frame means having supporting wheels provided thereon. The rack is designed to accommodate either four or six stacks of pallets thereon. The pallet rack is moved beneath the underside of the trailer floor and is vertically movably mounted with respect to the trailer by means of a pair of winch assemblies. The winch assemblies are quickly and easily adjustably mounted at the underside of the trailer floor without any welding or drilling being required. The fact that the winch assemblies are quickly and easily adjustably mounted at the underside of the floor permits the pallet rack to be longitudinally shifted to place the weight thereof either on the rear axle of the trailer or on the truck.

BRIEF DESCRIPTION OF THE DRAWINGS

FIG. 7 is a cross-sectional view taken at lines 7—7 in FIG. 2.

DESCRIPTION OF THE PREFERRED EMBODIMENT

Figure 1:
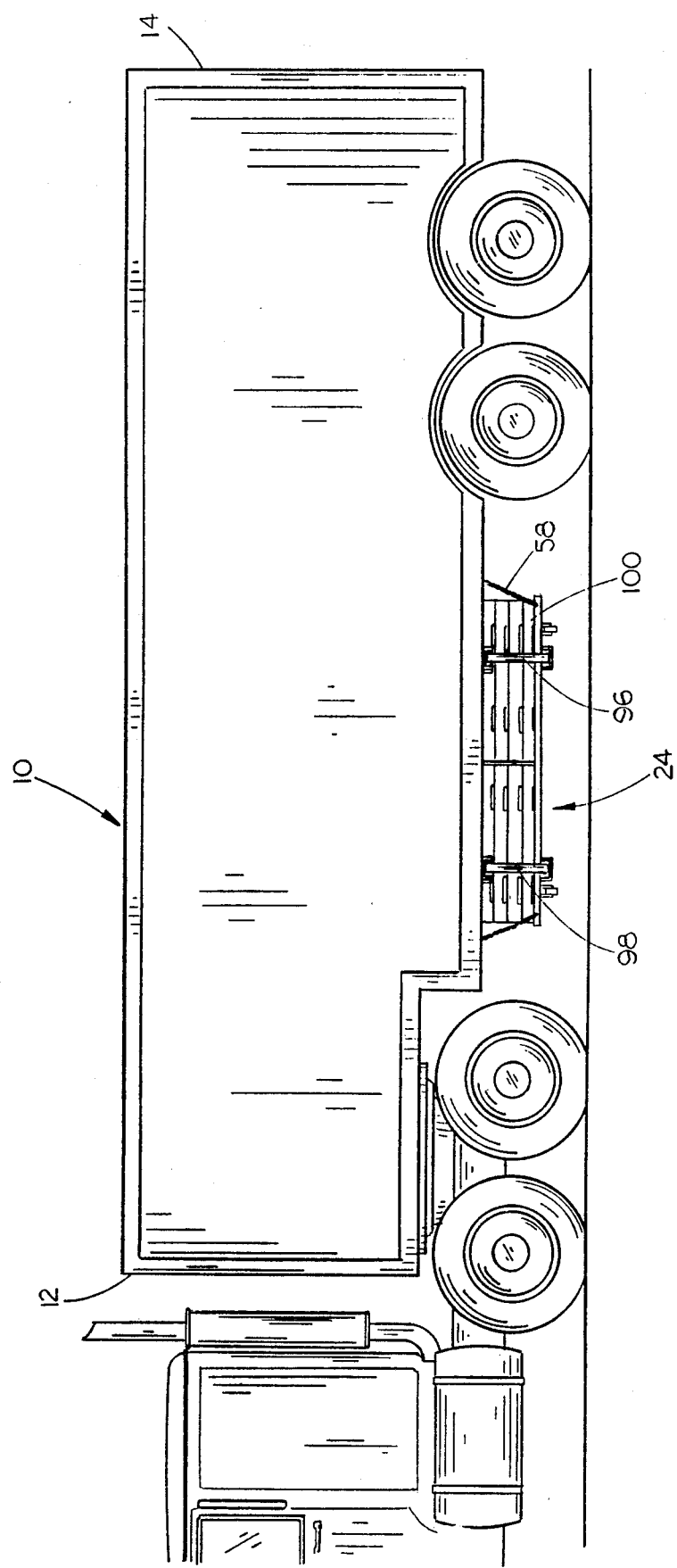
FIG. 1 is a side view of the pallet rack of this invention mounted on the underside of a trailer.

The numeral 10 refers to a conventional trailer having a forward end 12 and a rearward end 14. Trailer 10 includes a plurality of transversely extending I-beams 16 including upper and lower flanges 18 and 20 respectively. The beams 16 support the floor of the trailer generally referred to by reference numeral 22

Figure 2:
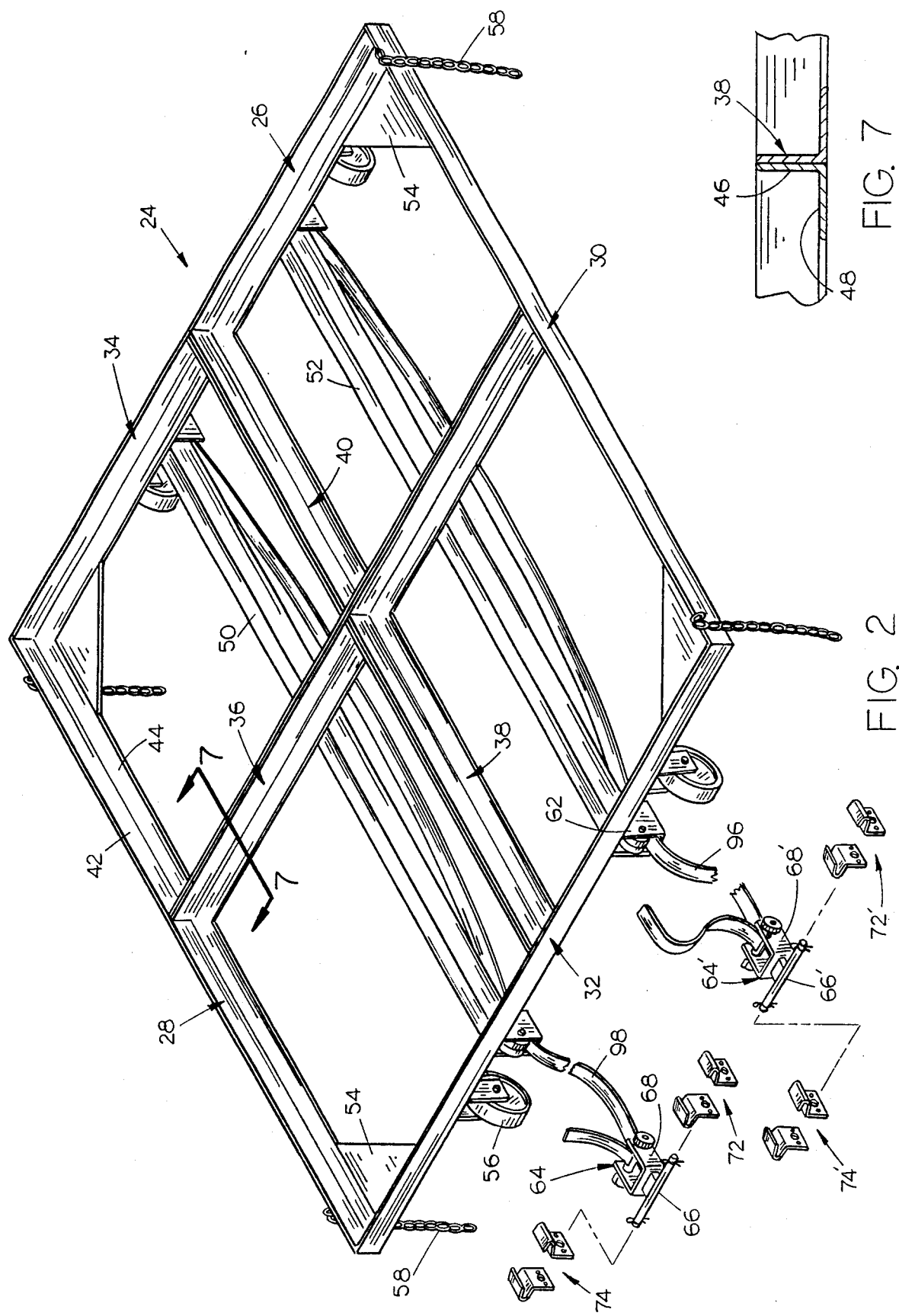
FIG. 2 is a perspective view of one form of the pallet rack.
Figure 3:
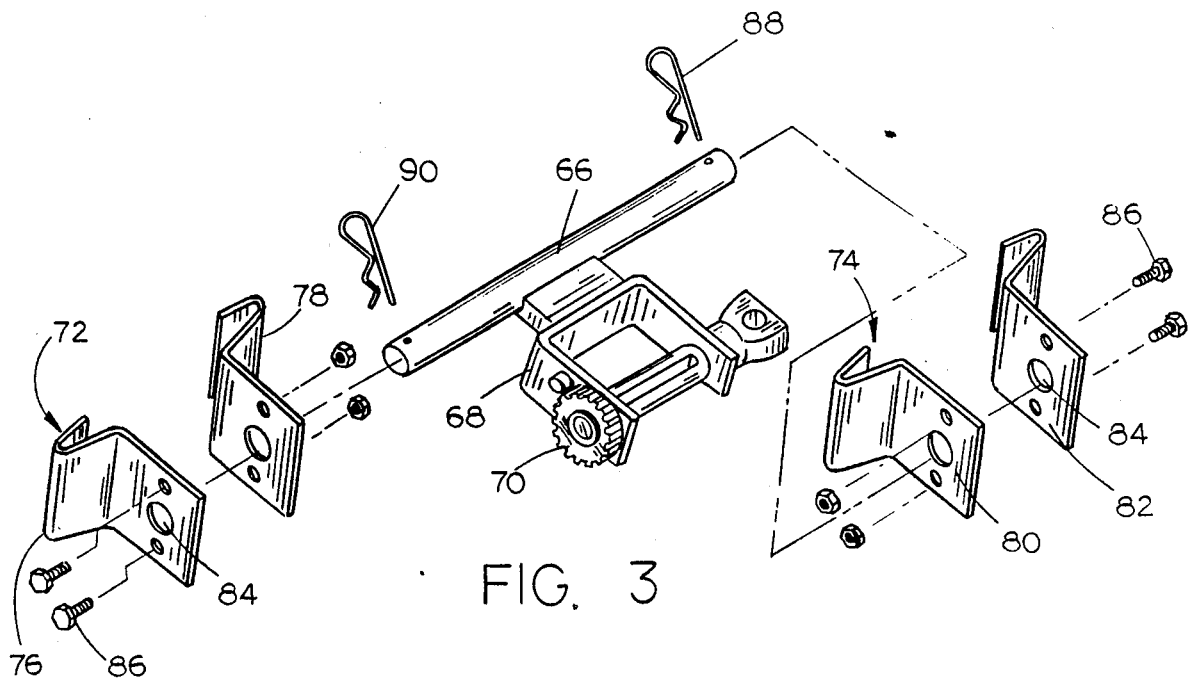
FIG. 3 is a perspective view of one of the winch assemblies and the means for mounting the same on the underside of the trailer.

The pallet rack or carrier of this invention is referred to generally by the reference numeral 24 and generally includes a wheeled frame means 26. Frame means 26 includes front frame member 28, rear frame member 30, side frame members 32 and 34, intermediate frame member 36 which extends between frame members 28 and 30, transversely extending frame member 38 which extends between side frame member 32 and intermediate frame member 36, and transversely extending frame member 40 which extends between intermediate frame member 36 and side frame member 34 as illustrated in FIG. 2. Frame members 28, 30, 32 and 34 are each of the angle iron configuration having a vertically disposed portion 42 and a horizontally disposed portion 44. Each of the frame members 36, 38 and 40 are of the double angle iron configuration as illustrated in FIG. 7 which include a vertically disposed portion 46 and a horizontally disposed portion 48. Supporting frame members 50 and 52 are secured to the undersides of frame members 32 and 34 and extend therebetween as illustrated in FIG. 2. The frame means is provided with a plurality of gusset plates 54 at the corners thereof as seen in FIG. 2. A plurality of wheels 56 are secured to the underside of the frame means 26 to provide the necessary maneuverability of the carrier. A plurality of safety chains 58 are secured to frame means 26 for purpose to be discussed hereinafter. A pair of roller assemblies 60 are secured to the underside of frame member 34 while a pair of roller assemblies 62 are secured to the underside of frame member 32.

A pair of winch assemblies 64 and 64' are selectively removably secured to the underside of the trailer as will now be described. Inasmuch as each of the winch assemblies 64 and 64' are identical, only winch assembly 64 will be described in detail with "'" indicating like structure on winch assembly 64'.

Figure 4:
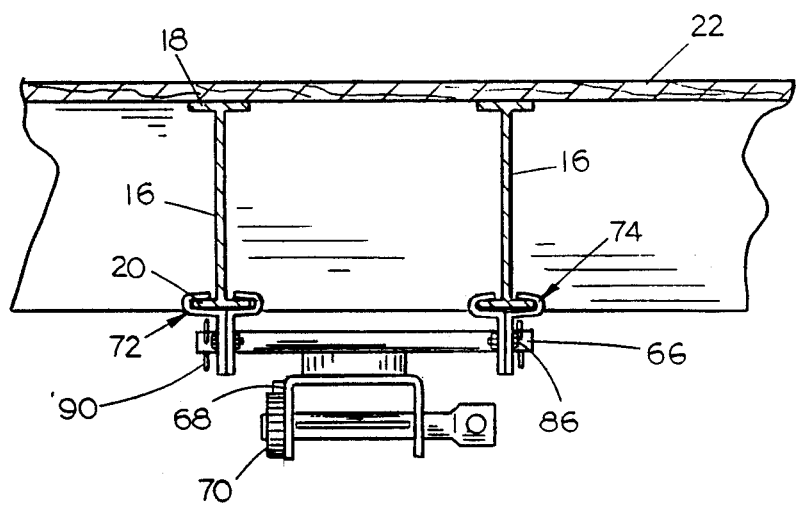
FIG. 4 is a side view illustrating the manner in which one of the winch assemblies is secured to the underside of the trailer.
Figure 5:
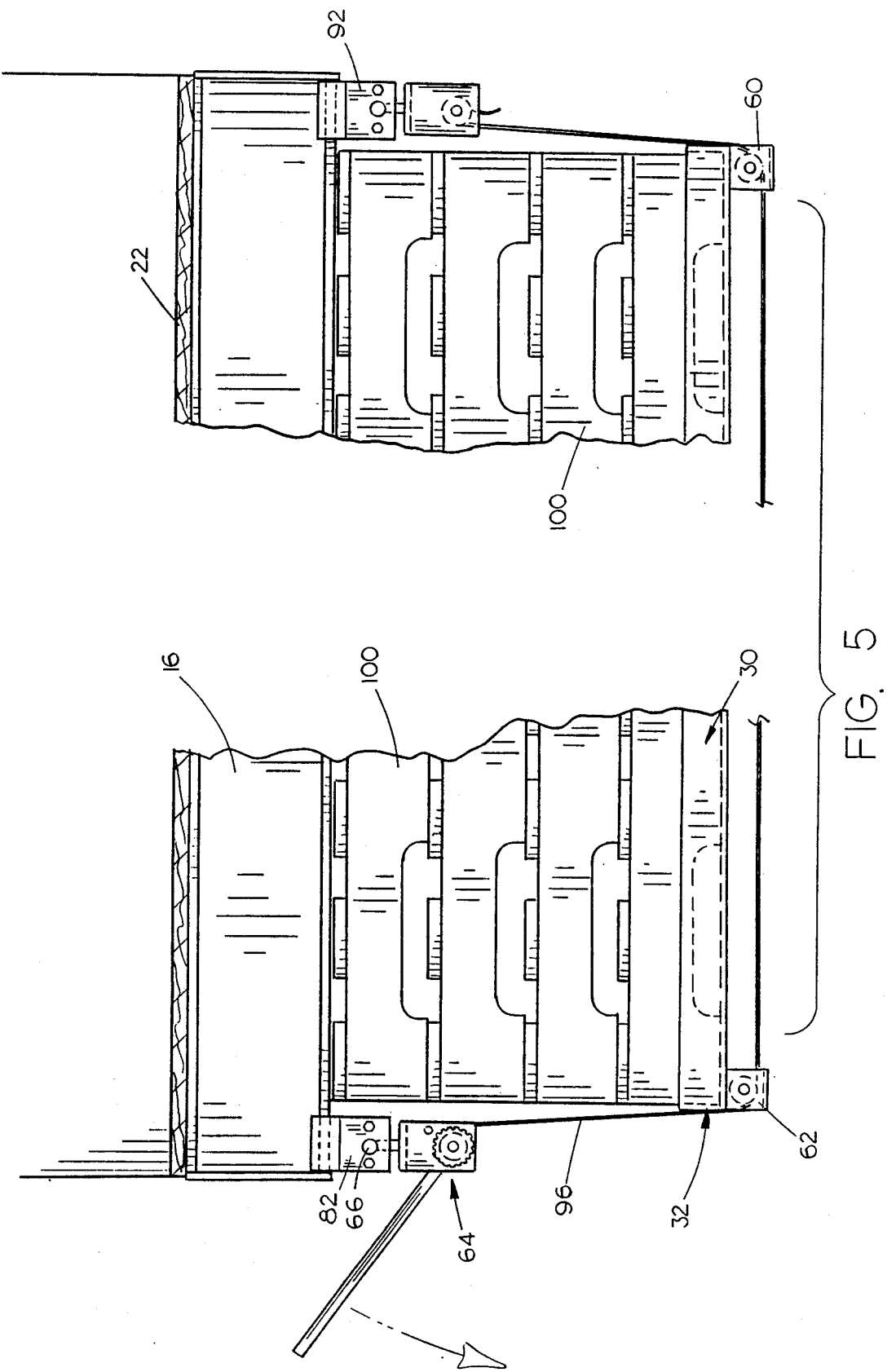
FIG. 5 is a partial front elevational view illustrating the pallet rack being supported beneath the underside of the trailer.

Winch assembly 64 includes a horizontally disposed shaft having an inverted U-shaped bracket 68 positioned therebelow. A conventional ratchet-type winch or belt tightener is mounted on bracket 68 in conventional fashion as seen in the drawings. Shaft 66 is quickly and easily secured to a pair of the supporting beams 16 by a pair of clamp assemblies 72 and 74. Clamp assembly 72 is comprised of a pair of opposing clamps 76 and 78 while clamp assembly 74 is comprised of a pair of opposing clamps 80 and 82. As seen in the drawings, the opposite ends of the shaft 66 extend through openings 84 formed in the clamps with the clamps being secured together as seen in FIG. 4 by a plurality of bolts 86. Shaft 66 is maintained in the clamp assemblies by pins 88 and 90.

A pair of supports 92 and 94 (not shown) are also secured to the underside of the trailer opposite to the winch assemblies and are secured to the supporting beams 16 in the same fashion as that described for the winch assemblies. The ends of straps 96 and 98 are secured to the assemblies 92 and 94 respectively and extend downwardly therefrom.

Figure 6:
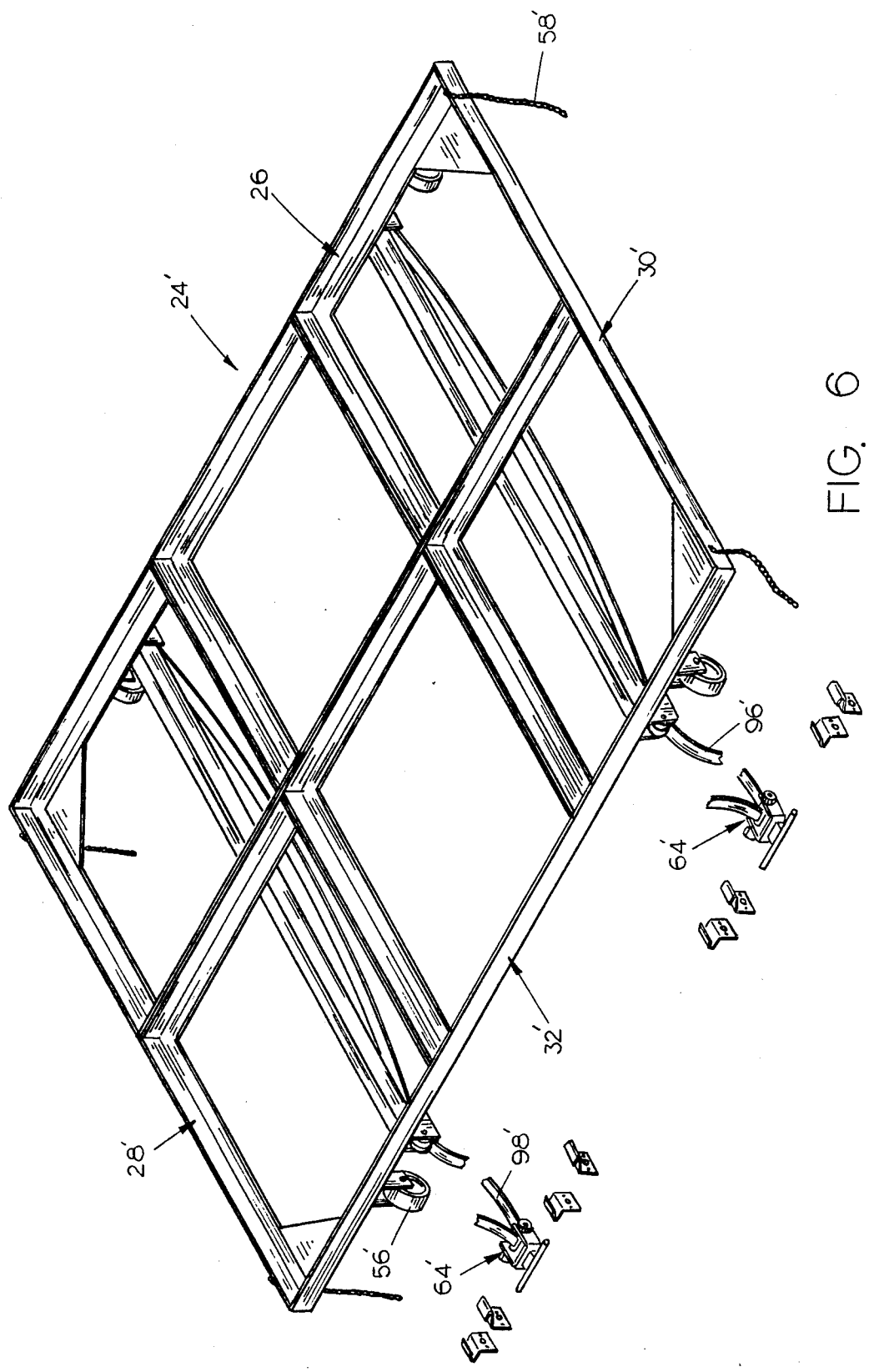
FIG. 6 is a perspective view of a modified form of the pallet rack.

FIG. 6 illustrates a modified form of the carrier with the only difference being that the carrier of FIG. 6 is designed to carry six stacks of pallets rather than the embodiment of FIG. 2 which is designed to carry four stacks of pallets.

The carrier of this invention is utilized as follows. When it is desired to support a plurality of pallets 100 at the underside of the trailer, the pallets 100 are positioned on the carrier 24 with the horizontal flanges of the various angle irons and the gusset plates preventing the pallets from falling downwardly through the carrier. The vertically disposed portions of the various angle members limit the longitudinal and lateral movement of the pallets.

When the pallets have been arranged on the carrier 24 in a stacked condition, the carrier 24 is rolled beneath the underside of the trailer. The ends of the straps 96 and 98 are secured to the assemblies 92 and 94 respectively and the straps are extended beneath the rollers 62 as illustrated. The ends of the straps 96 and 98 are then conventionally secured to the winch assemblies 64 and 64' and the winch assemblies are actuated to tighten or shorten the straps 96 and 98 which causes the carrier 24 to be vertically moved upwardly from the ground so that the uppermost pallets 100 in each of the stacks engage the underside of the trailer. The safety chains 58 are then secured to the underside of the trailer purely as a safety means in the event that one of the winch assemblies or the straps should break.

The winch assemblies 64 and 64' as well as the bracket assemblies 92 and 94 may be easily longitudinally moved on the underside of the trailer and secured to the proper supporting beams without modification to the supporting beams due to the means by which the assemblies 64, 64', 92 and 94 are clamped onto the lower webs of the supporting beams. Such a feature permits the weight of the carrier, and the pallets thereon, to be shifted longitudinally with respect to the trailer so that the weight of the carrier and the pallets may either be imposed on the rear axle or on the truck.

The ease by which the carrier 24 is mounted at the underside of the trailer permits the carrier to be easily removed therefrom should it be necessary for the trailer to negotiate curbs, obstructions, ditches, etc.

Thus it can be seen that the invention accomplishes at least all of its stated objectives.

I claim:

1. In combination:
   a wheeled trailer having a floor means spaced above ground level, said floor means having an underside,
   a wheeled pallet support means adapted to support a plurality of stacked pallets thereon beneath the underside of said floor means, and
   at least a pair of spaced apart belt and winch means operatively interconnecting said pallet support means and said trailer for selectively raising and lowering said pallet support means and the pallets thereon with respect to said floor means,
   each of said belt and winch means comprising:
      a first bracket means operatively secured to said trailer at one side thereof beneath said floor means,
      an elongated flexible strap means secured at one end thereof to said first bracket means and extending downwardly therefrom and thence beneath said pallet support means towards the other side of said trailer,
      a second bracket means operatively secured to said trailer at the other side thereof beneath said floor means, and
      a winch means operatively secured to said second bracket means adapted to engage the other end of said strap means whereby said strap means may be selectively rolled upon said winch means to raise said pallet support means or selectively unrolled therefrom to lower said pallet support means.

2. The combination of claim 1 wherein said pallet support means is provided with at least one roller means at each side thereof which has said strap in engagement therewith.

3. The combination of claim 1 wherein said first and second bracket means are removably secured to said trailer.

4. The combination of claim 1 wherein said trailer includes a floor support means having a plurality of spaced apart stringers, each of said first and second bracket means being removably clamped to one of said stringers.

5. The combination of claim 4 wherein each of said second brackets comprises first and second clamps secured to spaced apart stringers and extending downwardly therefrom, a shaft, removably secured to and extending between said clamps, said winch means being operatively secured to said shaft.

6. A pallet carrier for use with a wheeled trailer having a floor means spaced above ground level,
   a wheeled pallet support means adapted to support a plurality of stacked pallets thereon beneath the underside of said floor means, and
   at least a pair of belt and winch means adapted for operable connection to said trailer and operatively interconnected to said pallet support means, for selectively raising and lowering said pallet support means and the pallets thereon with respect to said floor means,
   each of said belt and winch means comprising:
      a first bracket means adapted for operative securement to said trailer at one side thereof beneath said floor means,
      an elongated flexible strap means secured at one end thereof to said first bracket means and extending downwardly therefrom and thence beneath said pallet support means, a second bracket means adapted for operative securement to said trailer at the other side thereof beneath said floor means, and a winch means operatively secured to said second bracket means adapted to engage the other end of, said strap means whereby said strap means may be selectively rolled upon said winch means to raise said pallet support means or selectively unrolled therefrom to lower said pallet support means.

7. In combination:

a wheeled trailer having a floor means spaced above ground level, said floor means having an underside, a wheeled pallet support means adapted to support a plurality of stacked pallets thereon beneath the underside of said floor means, and at least a pair of spaced apart belt and winch means operatively interconnecting said pallet support means and said trailer for selectively raising and lowering said pallet support means and the pallets thereon with respect to said floor means, said trailer including a floor support means having a plurality of spaced-apart stringers;

each of said belt and winch means including means for removably clamping said belt and winch means to one of said stringers;

said means for removably clamping said belt and winch means comprising first and second clamps secured to spaced-apart stringers and extending downwardly therefrom, and a shaft removably secured to and extending between said clamps.

* * * * *